United States Patent [19]

Armbruster

[11] Patent Number: 4,514,197
[45] Date of Patent: Apr. 30, 1985

[54] FILTER FOR AIR CIRCULATOR

[76] Inventor: Joseph M. Armbruster, 2700 NE. 47th St., Lighthouse Point, Fla. 33064

[21] Appl. No.: 467,074

[22] Filed: Feb. 15, 1983

[51] Int. Cl.³ .............................................. B01D 50/00
[52] U.S. Cl. .................. 55/316; 55/385 A; 55/387
[58] Field of Search ............... 55/316, 318, 320, 322, 55/483, 489, 521, 385 A, 387

[56] References Cited

U.S. PATENT DOCUMENTS

| | | | |
|---|---|---|---|
| 1,802,941 | 4/1931 | Drager | 55/387 |
| 2,764,258 | 9/1956 | Bub et al. | 55/521 |
| 2,886,124 | 5/1959 | Scharmer | 55/316 |
| 3,436,352 | 4/1959 | Revoir et al. | 55/387 X |
| 3,654,747 | 4/1972 | Remick | 55/316 X |
| 3,712,030 | 1/1923 | Priest | 55/387 |
| 4,365,981 | 12/1982 | McDonough | 55/483 X |
| 4,370,155 | 1/1983 | Armbruster | 55/316 |
| 4,374,655 | 2/1983 | Grodzka et al. | 55/387 X |

FOREIGN PATENT DOCUMENTS 2146159  7/1971  France ................. 55/316

Primary Examiner—Charles Hart
Attorney, Agent, or Firm—Harvey B. Jacobson

[57] ABSTRACT

A filter for air circulators including a layer of activated charcoal or similar carbon material received between a substantially planar screen of mesh material and a corrugated screen of mesh material forming the charcoal or carbon into a plurality of areas having triangular configuration with the areas being the same size and shape. This configuration of the carbon in the filter is obtained by attaching the periphery and alternate crests of the corrugated screen together into a single unitary construction. The filter also includes a frame having an inwardly extending flange on the air inlet surface of the filter with the flange being spaced from the crests of the corrugated screen remote from the planar screen to receive and mount a flexible first stage filter or prefilter of cellular material such as flexible foam rubber, foam plastic or the like so that the foam prefilter will be positioned against the crests of the corrugated screen to remove particulate material such as dust, lint, pollen or the like from the incoming air with the periphery of the foam material underlying the flange to enable it to be easily removed for cleaning by holding under running water, immersing in water or the like and installing it by reinserting the peripheral edge of the foam prefilter under the peripheral flange on the frame of the filter.

2 Claims, 5 Drawing Figures

U.S. Patent   Apr. 30, 1985   4,514,197
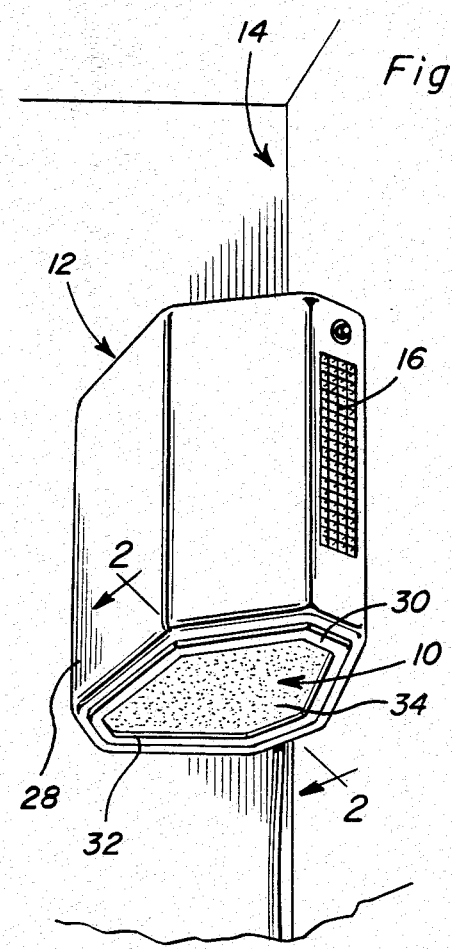
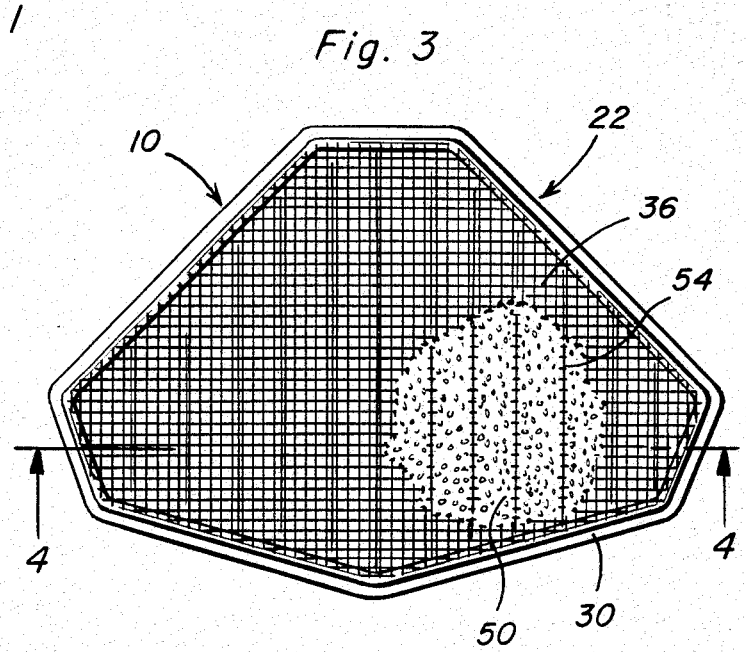
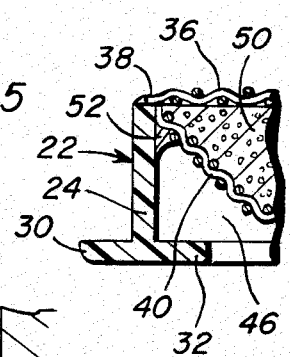
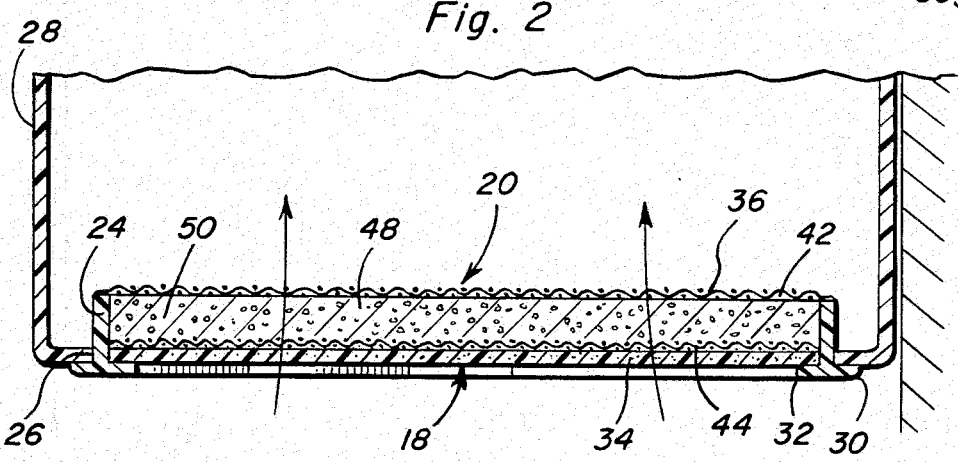
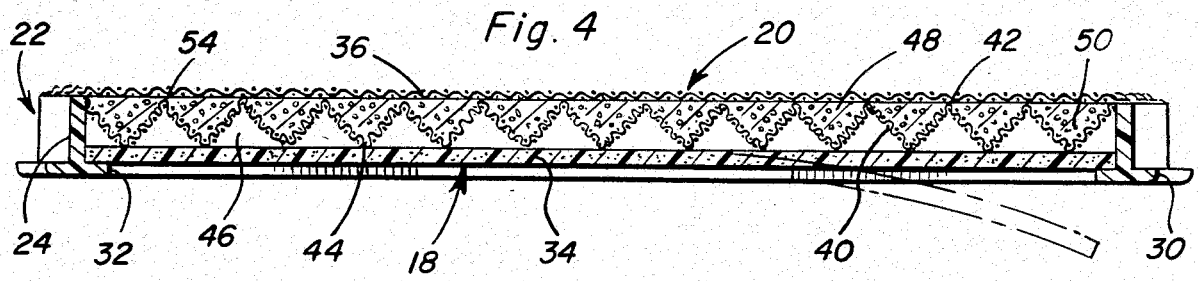

FILTER FOR AIR CIRCULATOR

BACKGROUND OF THE INVENTION

1. Field of the Invention

The present invention generally relates to a filter used in combination with an air circulator which includes a foam-type first stage or prefilter and a carbon-type main filter or final stage filter oriented in the intake of an air circulator with the air entering the filter through the foam-type prefilter. The carbon filter includes activated charcoal oriented between a flat screen and a corrugated screen to form the layer of charcoal into triangularshaped segments by securing alternate crests of the corrugated screen to the flat screen.

2. Description of the Prior Art

Filters associated with various types of circulating devices are well known and generally perform in a manner to remove paticulate material from the circulated air. Also carbon-type filters are used frequently in association with air circulating devices with such filters usually including a flat panel constructed of porous carbon material or the like. In other installations, a combination filter arrangement is employed including one type of filter element for removing particulate material and another type of filter element employing carbon and other material for removing objectionable odors and the like.

SUMMARY OF THE INVENTION

An object of the present nvention is to provide a filter for an air circulator such as that disclosed in my U.S. Pat. No. 4,370,155, issued Jan. 25, 1983, or any other air circulator utilizing a fan or the like to induce air inflow through a filter and subsequent discharge of the filtered air into a room or the like with the filter including a removable foam-type first stage filter or prefilter for removing particulate material such as dust, lint, pollen or the like with the foam prefilter being removable for easy cleaning by holding it under running water, immersing it under water while agitating and then replacing it in the filter. In addition, a main filter of carbon material such as acivated charcoal or the like is provided inwardly of the prefilter and in contact therewith with the charcoal filter being in the form of a layer interposed between a generally flat screen and a corrugated screeen having alternate crests secured to the flat screen thereby forming the layer of carbon material into a plurality of identical areas of triangular cross-sectional configuration with each of the areas extending continuously from one side to the other of the filter.

Another object of the invention is to provide a filter for air circulators in accordance with the preceding object in which the filter is provided with a peripheral frame having an inwardly extending flange spaced from the corrugated screen with the flange receiving the periphery of the foam prefilter thereunder to retain the foam prefilter removably in the inlet of the filter.

A further object of the invention is to provide a filter for air circulators which can have different configurations to be used with different types of air circulators with the frame and screens being constructed of metal or plastic with plastic material being simply constructed by injection molding techniques with the flat screen and corrugated screen being plastic welded or bonded together and to the plastic frame thereby providing a unitary construction except for the removable foam-type prefilter.

Still another object of the invention is to provide a filter in accordance with the preceding objects which is simple in construction, easy to install, easy to maintain by cleaning the prefilter and effective in removing particulate material, odors, other impurities and discharging the cleaned air back into a room or other enclosure.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of an air circulator with the filter of the present invention installed therein.

FIG. 2 is a vertical sectional view taken substantially upon a plane passing along section line 2—2 of FIG. 1 illustrating the structural details of the filter.

FIG. 3 is a plan view of the filter from the discharge side thereof.

FIG. 4 is a transverse sectional view on an enlarged scale, taken substantially upon a plane passing along section line 4—4 of FIG. 3 illustrating further structural details of the filter including the manner in which the prefilter is retained in position.

FIG. 5 is an enlarged fragmental sectional view of the filter frame and the screens connected therewith.

DESCRIPTION OF THE PREFERRED EMBODIMENT

Referring now specifically to the drawings, the filter of the present invention is generally designated by the reference numeral 10 and is illustrated in combination with an air circulator generally designated by the numeral 12 that is mounted in the corner area 14 of a room or other enclosure with the filter 10 being disposed in either or both the bottom and top of the air circulator 12 so that air entering the air circulator 12 will pass through the filter 10 and be discharged through the side discharge outlets 16 or the like. This type of air circulator 12 is similar to that disclosed in my U.S. Pat. No. 4,370,155, issued Jan. 25, 1983. It is pointed out that the filter 10 may be used with both types of air circulators disclosed in that patent and may also be used with other types of air circulators by altering the plan configuration, size and shape of the filter to conform with the size and shape of the inlet opening for the air circulator 12.

The filter 10 includes a prefilter or first stage filter generally designated by the numeral 18 which is constructed of a relatively thin layer of flexible, resilient foam material such as foam plastic, foam rubber or the like and a carbon main filter or final stage filter generally designated by the numeral 20 which is located inwardly of the prefilter 18 so that air will first pass through the prefilter 18 and then through the main filter 20 as indicated in FIG. 3.

The filter 10 includes a peripheral frame 22 and including a peripheral frame member 24 which telescopes into and is closely received in an air inlet opening 26 in the housing 28 of the air circulator 12. The outer edge of the frame member 24 is provided with a peripheral flange 30 extending laterally outwardly and adapted to engage the outer surface of the housing 28 adjacent the opening 26 with suitable mounting screws or other fastening means extending through the flange 30 and into the flange which defines the opening 26 to removably secure the filter 10 in place. If the housing and filter frame are constructed of plastic material, fasteners may be omitted and a friction fit or a snap fit may be provided to removably retain the filter 10 in the inlet opening 26 of the air circulator 12. The frame member 24 also includes a peripheral inwardly extending flange 32 which overlies, engages and retains a thin panel of foam material 34 which forms the prefilter 18 with the foam material 34 being flexible, resilient and cellular in construction and may be in the form of foam rubber, foam plastic or the like so that by pulling the edges of the panel 34 out from under the flange 32, the prefilter 18 may be easily removed for cleaning by holding it under running water, immersing in water and agitating or the like and the prefilter 18 may then be reassembled with the periphery under the flange 32 in a quick and easy manner.

The main filter 20 includes a flat or planar screen 36 of mesh material having the periphery thereof secured to the inner edge of the frame member 24 as at 38 in FIG. 5. Inwardly of the screen 36 is a corrugated screen 40 having V-shaped corrugations therein defining alternate inner crests 42 and alternate outer crests 44 with the inner crests being engaged with and secured to the inner surface of the screen 36 and the outer crests 44 being engaged with and supporting the prefilter 18 as illustrated in the FIG. 4 thereby defining a plurality of triangular-shaped areas 46 between the corrugated screen 40 and the prefilter 18 and triangular-shaped areas 48 between the screen 40 and the screen 36. The areas 48 are filled with porous carbon materials 50 such as activated charcoal with the carbon material being formed into areas with a triangular cross-sectional configuration with the apex of such material being located at the crests 44 disposed adjacent and in engagement with the prefilter 18 whereas the base of the triangular cross-sectional area is located at the screen 36. As illustrated in FIG. 5, the corrugated screen 40 has the peripheral edge secured to the frame member 24 as at 52 and the crests 42 are secured to the screen 36 along the lines indicated by numeral 54 in FIG. 3. By constructing the frame 22 and screen members 36 and 40 from plastic material, the screens 36 and 40 may be attached to each other and connected to the frame member 24 by a plastic welding or bonded technique with these components being easily constructed by using an injection molding technique.

As illustrated, the flange 32 is spaced from the crests 44 of the screen 40 a distance substantially equal to the thickness of the prefilter 18 as illustrated in FIG. 4 so that the crests 44 of the screen 40 will engage and support the prefilter 18 and prevent it from being drawn into the void triangular areas 46. The periphery of the flexible foam panel 34 can be pulled inwardly by following various procedures such as by grasping the center portion of the panel 34 and pulling it outwardly and when reinstalling the foam panel 34 the peripheral edges are merely tucked under the flange 32. As indicated, the plan configuration as illustrated in FIG. 3 may be altered to any shape conforming to the shape of the inlet opening 26 in the air circulator housing 28. As air enters the filter, the prefilter 18 will remove particulate material such as dust, lint, pollen and the like entrained in the air. As air enters the main filter 20, it will scrub across the carbon material 50 as it moves in the void area 46 to the area where the crests 42 join the screen 36 thereby reducing the static pressure by increasing the surface area through which the air flows as compared to a flat carbon filter panel.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A filter for use with an air circulator having an airflow passage, said filter comprising a frame, a pair of screens having peripheral portions connected to the frame to form an enclosure with the main portions of the screens being spaced apart to form a space, at least one screen being corrugated with alternate crests being disposed upstream and downstream of the airflow, and a layer of activated carbon filling the space between the screen with the carbon conforming with the corrugations to increase the surface area exposed to the airflow, said downstream screen being flat, said corrugated screen having alternate crests adjacent the flat screen, said corrugated screen having V-shaped corrugations to define a plurality of areas filled with filter material of triangular cross sectional configuration with the apexes upstream, thereby providing a filter with the thinnest areas of the filter being located at the points of adjacency of the flat screen and alternate crests of the corrugated screen, said frame including an inwardly extending flange in spaced overlying relation to the upstream apexes of the corrugated screen, and a prefilter in the form of a panel of flexible, resilient foam plastic material engaging the apexes of the corrugated screen remote from the flat screen with the periphery of the resilient panel being inserted under the inwardly extending flange on the frame to prefilter air entering the airflow passage prior to it engaging the activated carbon with the inwardly extending flange retaining the prefilter panel in place and the flexibility of the foam plastic enabling the prefilter panel to be removed so that particulate material removed from the air by the prefilter panel can be easily washed from the foam material by holding it under running water or squeezing it while immersed in water or other cleaning solution, said triangular areas of activated carbon providing a maximum surface scrub area and providing equal static pressure along the inner surface of the prefilter to assure that air will scrub over the entire corrugated surface of the activated carbon with the evenly distributed air passing through the prefilter traveling down the sides of the triangular areas of the activated carbon and scrubbing against such surfaces while maintaining a low static pressure requirement to move air through the carbon material at the areas in which the corrugated screen crests are disposed adjacent the flat screen.

2. In combination with an air circulator having a housing with an air inlet opening defined by an inwardly extending peripheral flange, a filter mounted in said air inlet opening, said filter comprising a peripheral frame including a frame member of generally T-shaped configuration with the shank of the T-shaped frame member being telescoped into the inlet opening and the transverse portion of the T-shaped frame member defining an outwardly extending flange and an inwardly extending flange with the outwardly extending flange limiting the insertion of the frame member into the inlet opening by engaging the outer surface of the inwardly extending flange on the housing defining the inlet opening with the peripheral frame member being removably retained in the inlet opening, said filter including a flat screen extending transversely of the frame member and being secured thereto at the inner end of the frame member, a corrugated screen member having alternate crests disposed adjacent the flat screen and the periphery of the corrugated screen being secured to the frame member adjacent the flat screen, the area between the corrugated screen and flat screen being filled with activated carbon to form a plurality of triangular areas having their apexes remote from the flat screen, and a prefilter in the form of a panel of flexible, resilient foam plastic material engaging the apexes of the corrugated screen remote from the flat screen with the periphery of the resilient panel being inserted under the inwardly extending flange on the peripheral frame member to prefilter air entering the air inlet opening prior to it engaging the activated carbon with the inwardly extending flange retaining the prefilter panel in place and the flexibility of the foam plastic enabling the prefilter panel to be removed so that particulate material removed from the air by the prefilter panel can be easily washed from the foam material by holding it under running water or squeezing it while immersed in water or other cleaning solution, said triangular areas of activated carbon providing a maximum surface scrub area and providing equal static pressure along the inner surface of the prefilter to assure that air will scrub over the entire corrugated surface of the activated carbon with the evenly distributed air passing through the prefilter traveling down the sides of the triangular areas of the activated carbon and scrubbing against such surfaces while maintaining a low static pressure requirement to move air through the carbon material at the areas in which the corrugated screen crests are disposed adjacent the flat screen.

* * * * *